United States Patent [19]

Jones

[11] 4,176,817

[45] Dec. 4, 1979

[54] RELEASABLE HOLDER FOR BOXES

[76] Inventor: Willard H. Jones, 526 Pratt St., Longmont, Colo. 80501

[21] Appl. No.: 947,239

[22] Filed: Sep. 27, 1978

[51] Int. Cl.² ............................................. F16M 13/00
[52] U.S. Cl. ................................. 248/313; 248/316 E; 248/DIG. 5
[58] Field of Search ............... 248/311.1, 313, 316 E, 248/DIG. 5, 452; 221/45, 46; 222/180, 181

[56] References Cited

U.S. PATENT DOCUMENTS

| 936,927 | 10/1909 | McCallum | 248/313 X |
| 1,858,144 | 5/1932 | Fariello | 248/313 X |
| 2,325,712 | 8/1943 | Shurmur | 248/313 |
| 3,285,559 | 11/1966 | Simon | 248/313 |
| 3,549,113 | 5/1968 | Pagliuso | 248/187 |

FOREIGN PATENT DOCUMENTS 1169919 11/1969 United Kingdom ..................... 248/313

Primary Examiner—William H. Schultz
Attorney, Agent, or Firm—O'Rourke & Harris

[57] ABSTRACT

A box holder for releasably engaging and securing pliable boxes, such as tissue boxes, by engaging one side portion of the box with a projecting end portion of the support, the end portion preferably being a planar surface extending normal to the base portion of the support and having pointed projections thereon to engage the box, the base portion of the support extending across the bottom of the box and carrying a rotatable eccentric member adapted to securely engage the opposite side portion of the box upon rotation and be maintained in such engagement by securing means which preclude undesired rotation of the eccentric member.

9 Claims, 3 Drawing Figures

U.S. Patent
Dec. 4, 1979
4,176,817
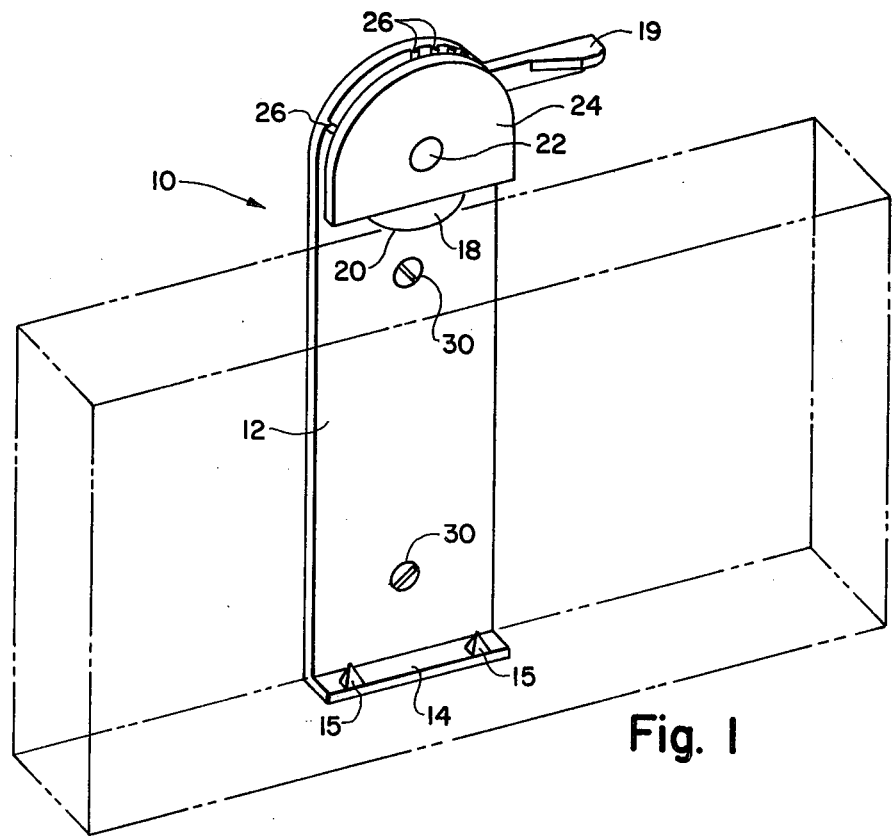
Fig. 1
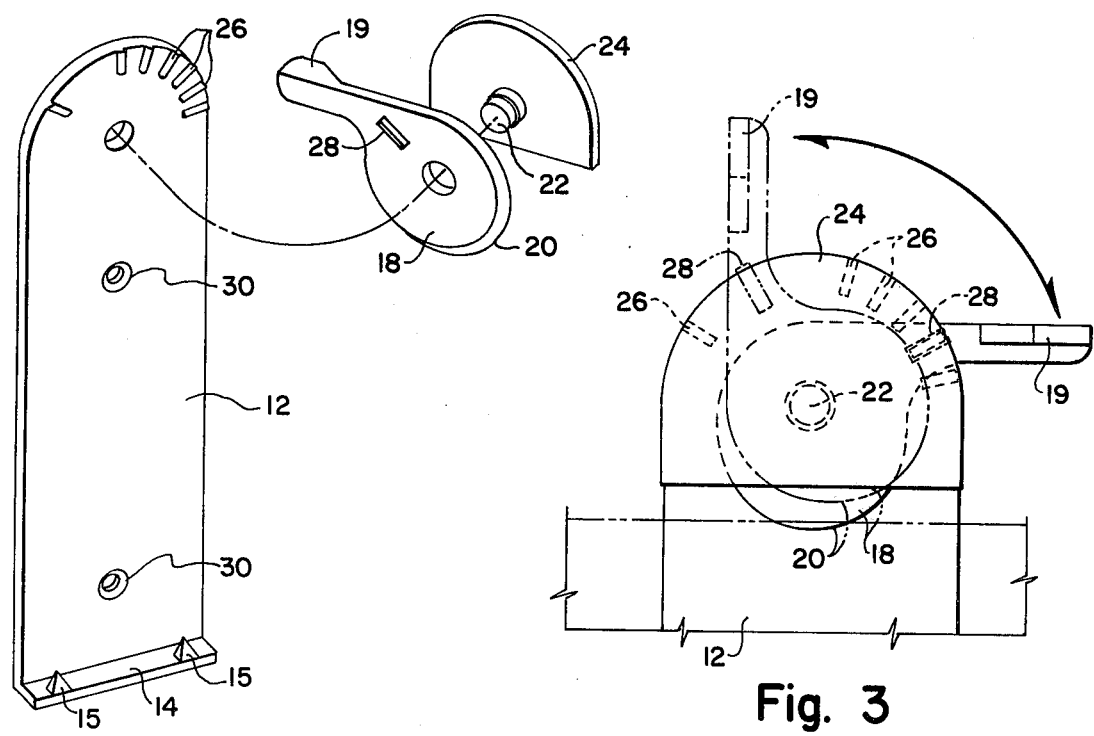
Fig. 2
Fig. 3

RELEASABLE HOLDER FOR BOXES

BACKGROUND OF THE INVENTION

1. Field of the Invention

The present invention relates generally to a box holder for pliable boxes, and more particularly to a releasable support adapted to securely engage and hold a pliable box, such as a tissue box.

2. Description of the Prior Art

The convenience of a support for boxes, such as tissue boxes, has given rise to a substantial number of designs of such holder, brackets and supports. Generally, it is desirable that box holders securely engage the box, be adaptable to support boxes of at least minor variations and dimensions, and readily release the box when empty. Also, it is desirable that this be accomplished with a simple, inexpensive design.

U.S. Pat. Nos. 3,258,238, 3,285,559, 3,733,044, and 3,837,608 illustrate one school of effort concerning mounting of pliable boxes. The first listed patent essentially engages the box on four sides with a bracket of limited resilience. Accordingly, the holder must be of essentially the same dimensions as the box to be engaged. The other of the listed patents disclose devices which engage opposed sides of the box, usually about midway on such side. The engaging members are essentially resilient and utilize, in instances, pointed members to key into the sides of the box. Again, the range of box sizes which may be supported is severely limited by the limited resilient nature of the engaging members. Also, engagement is substantially at the weakest portion of the box side, or involves substantial distortion of the entire box, thereby compromising the strength of the box.

U.S. Pat. No. 2,964,282 discusses another design having greater adaptability in engaging boxes of varying design, but at the expense of substantial complexity. For instance, the embodiment illustrated in FIGS. 1 and 2 ultizes a watts linkage to interconnect opposing pointed members which engage the box. While the mechanical complexity provides desired performance, cost renders the concept impractical for many applications.

Accordingly, it will be recognized that the prior art designs tend to be simple but relatively inflexible in accomodating boxes of various dimensions, of limited holding power or otherwise causing substantial distortion of the walls of the box, or, finally, tending towards substantial mechanical complexity when adapted to accomodate boxes of differing sizes without crushing the box and at the same time providing secure engagement of the box.

SUMMARY OF THE INVENTION

The present invention, which provides a heretofore unavailable combination of desirable features not available in previous box supporting mechanisms, comprises a base member having at one end fixed, engaging means positioned to contact the wall of a box at a portion immediately adjacent the bottom portion thereof, and at the other end at substantially the same relative position with regard to the bottom of the box, a pivotable eccentric having a bevelled edge which, upon rotation, is adapted to engage and secure a box positioned between the pivotable eccentric and fixed engaging means of the support. By engaging the box at the side but immediately adjacent the bottom or other orthogonal wall thereof, the supports bear upon the sides at structurally strong portions of the essentially pliable wall. The bottom of the box provides substantial strength to the sides immediately adjacent the bottom, and accordingly permit securing forces of relatively high magnitude. Also, the eccentric member, when rotated, accomodates boxes of varying dimensions within the variation of the eccentric relative to the center of rotation.

Accordingly, an object of the present invention is to provide a new and improved holder for boxes having pliable walls.

Another object of the present invention is to provide a new and improved holder for boxes which accomodate varying dimensions in such boxes.

Yet another object of the present invention is to provide a new and improved holder for boxes which permits substantial engaging forces to securely hold the box.

Still another object of the present invention is to provide a new and improved holder for boxes which minimizes distortion of the box while concurrently providing secure engagement of the box by the support.

These and other objects and features of the present invention will become apparent from the following description.

BRIEF DESCRIPTION OF THE DRAWINGS

FIG. 1 is a perspective view of a box holder in accord with the present invention illustrates as engaging a box shown in ghosted fashion;

FIG. 2 is an exploded view of the box holder of FIG. 1; and

FIG. 3 is a detailed view of the eccentric mechanism illustrating the eccentric member in a retracted, ghosted position and in engaged position.

DETAILED DESCRIPTION OF THE INVENTION

Turning now to the drawings, wherein similar components are designated by like reference numerals throughout the various FIGURES, a holder for pliable boxes according to the instant invention is illustrated in FIG. 1 and generally designated by the reference numeral 10. As illustrated holder 10 includes base 12 having a right angle in projecting end Portion 14 positioned at one end thereof. Pointed members 15 are carried on end portion 14 and adapted to engage the side or end walls—but preferably the walls having the smallest dimension therebetween—of a box. At the other end of base 12 an eccentric 18 is pivotly mounted to base 12. Arm 19 is attached to eccentric 18 and bevelled edge 20 is preferably defined along the periphery of eccentric 18.

As shown in FIG. 2, pivot 22, adapted to extend through and pivotally mount eccentric 18 may be formed intergally with upper member 24. Upon assembly, pivot 22 is secured to base 12 thereby securely mounting eccentric 18 for rotation relative to both base 12 and upper member 24.

Locating means for eccentric 18 relative to base 12 and upper member 24 are provided, as illustrated, in the form of locating ridges 26 defined upon base 12 with the length of ridges 26 being positioned along various radials extending from the center of pivot 22. An indent 28 is defined in eccentric 18, and positioned to engage locating ridges 26 upon rotation of eccentric 18 by, for instance, applying force to arm 19.

Thus, a box may be positioned as illustrated in a ghosted manner in FIG. 1 and engaging end portion 14 at pointed members 15 at one side wall. At the other side wall of the box, as shown in FIG. 3, eccentric 18 would initially be positioned with arm 19 as shown in the ghosted position. However, by rotating eccentric 18 to the position illustrated by the solid presentation of arm 19, bevelled edge 20 of eccentric 18 would engage the adjacent side wall of a box and thus secure the box between eccentric exocentric 18 and end portion 14.

As illustrated in FIG. 1, base 12 includes holes 30 adapted to, for instance, receive screws to mount holder 10 to an adjacent surface. However, it is to be understood that clip members adapted to engage the visor of an automobile, magnetic supports, Velcro and other such conventional mounting means are contemplated, but clearly do not constitute a critical feature of the invention.

In operation, holder 10 displays a number of advantages. Clearly the structure is quite simple and avoids mechanical complication. By positioning pointed members 15 substantially immediately adjacent to the surface of base 12, pointed members 15 and end portion 14 will engage a side wall adjacent, for instance, the bottom of a box. At this point, the normally pliable side wall displays substantial structural strength as a result of the reenforcing provided by the adjacent bottom panel of the box. Similarly, at the opposed side portion of the box, bevelled edge 20, which again is adjacent to but slightly spaced from base 12 will engage the box side wall at the portion thereof displaying greatest structural strength. In many instances, bevelled edge 20 will actually cut into the side wall immediately adjacent the box bottom and thus key into the box to provide secure support therefor. However, this is generally accomplished without substantially crushing or defamation of the box.

While locating ridges 26 are illustrated as being formed on base 12, obviously such ridges could similarly be positioned on upper member 24, in which case indent 28 would be defined in the opposite side of eccentric 18. Other locating means for eccentric 18 could similarly be employed. For instance, indents could be defined in base 12 or upper member 24 and a ridge positioned on eccentric 18, though this would require somewhat more distortion of eccentric 20. However, it is contemplated that holder 10 will be formed of a material having a measure of elastic yield, such as a plastic or metal. Thermo-plastic materials are preferred to facilitate the fusing of pivot 22 to base 12, though any number of other means of construction would clearly be feasible.

Although but one of numerous possible embodiments of the present invention has been illustrated and described, it is anticipated that various changes and modifications will be apparent to those skilled in the art, and that such changes may be made without departing from the scope of the invention as defined by the following claims.

What is claimed is:
1. A holder for boxes comprising:
a base member having a planar surface defined thereon;
fixed engaging means carried on the planar surface of the base member and adapted to securely engage a surface disposed substantially normal to the planar surface at a position adjacent to the planar surface;
an eccentric member mounted adjacent the planar surface and spaced from the fixed engaging means, the eccentric member being rotatably carried on an axis perpendicular to the planar surface; and
locating means to releasably secure the eccentric member at one of a plurality of predetermined rotational positions.

2. A holder for boxes as set forth in claim 1 in which the engaging means comprise a surface projecting perpendicularly from and support by the planar surface, and at least one pointed member carried on the projecting surface and disposed towards the eccentric member at a position adjacent to but spaced from the planar surface.

3. A holder for boxes as set forth in claim 1 in which the eccentric member includes an arm extending therefrom and a bevelled edge defined along the periphery thereof, the bevel being positioned substantially between the planar surface and the resulting outer periphery of the eccentric member.

4. A holder for boxes as set forth in claim 3 in which an upper member is provided on the opposite side of the eccentric member from the planar surface, and in which the upper member is secured to the base member by means of a pivot extending through the eccentric member at the axis of rotation thereof.

5. A holder for boxes as set forth in claim 1 in which the locating means comprise a plurality of elongated ridges disposed on the planar surface along spaced radials centered upon the rotational axis of the eccentric member, and a cooperating detent defined in the eccentric member.

6. A holder for boxes as set forth in claim 1 in which means to secure the holder to adjacent surfaces is provided.

7. A holder for boxes comprising:
an elongated base member having a planar surface defined along the upper length thereof;
a projecting surface disposed at one end of the base member and carrying thereon at least one pointed member oriented with the pointed portion spaced from but adjacent to the planar surface and directed along the length of the base member;
an eccentric member positioned at the opposite end of the base member from the perpendicular surface, the eccentric being pivotally mounted to the base member at the planar surface for rotation around an axis perpendicular to the base member and extending on the same side of the base member as does the projecting surface; and
locating means interposed adjacent to the eccentric member to releasably position the eccentric member at a plurality of predetermined positions.

8. A holder for boxes as set forth in claim 7 in which the locating means comprise a plurality of ridges defined on the planar surface and aligned along spaced radials centered at the axis of rotation of the eccentric member, and a detent defined in the surface of the eccentric member adjacent to the base member.

9. A holder for boxes as set forth in claim 7 in which a bevelled edge defined on the eccentric member along the periphery thereof.

* * * * *